(12) United States Patent
Narasimhan

(10) Patent No.: US 11,861,174 B2
(45) Date of Patent: Jan. 2, 2024

(54) PRIORITIZING READ IO QUEUES IN NON-VOLATILE MEMORY EXPRESS DEVICES

(71) Applicant: Hewlett Packard Enterprise Development LP, Houston, TX (US)

(72) Inventor: Shyamsundar Narasimhan, Bangalore Karnataka (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 246 days.

(21) Appl. No.: 17/305,840

(22) Filed: Jul. 15, 2021

(65) Prior Publication Data

US 2023/0023568 A1    Jan. 26, 2023

(51) Int. Cl.
*G06F 3/06*    (2006.01)
(52) U.S. Cl.
CPC .......... *G06F 3/0611* (2013.01); *G06F 3/0659* (2013.01); *G06F 3/0679* (2013.01); *G06F 2212/7207* (2013.01)
(58) Field of Classification Search
CPC .... G06F 3/0611; G06F 3/0659; G06F 3/0679; G06F 2212/7207
See application file for complete search history.

(56) References Cited

U.S. PATENT DOCUMENTS

| | | | |
|---|---|---|---|
| 9,317,204 B2 | 4/2016 | Hahn et al. | |
| 9,588,699 B1 | 3/2017 | Colgrove et al. | |
| 10,042,563 B2 | 8/2018 | Nanduri et al. | |
| 11,050,825 B1* | 6/2021 | Marappan | G06F 3/067 |
| 2011/0060878 A1* | 3/2011 | Kaneko | G06F 3/067 |
| | | | 711/170 |
| 2018/0321945 A1* | 11/2018 | Benisty | G06F 13/00 |

FOREIGN PATENT DOCUMENTS

CN    106681661    2/2020

OTHER PUBLICATIONS

Joshi et al., "Enabling NVMe WRR support in Linux Block Layer," 9th USENIX Workshop on Hot Topics in Storage and File Systems (HotStorage 17), 2017, <https://www.usenix.org/system/files/conference/hotstorage17/hotstorage17-paper-joshi.pdf>.

(Continued)

*Primary Examiner* — Kalpit Parikh
(74) *Attorney, Agent, or Firm* — Trop, Pruner & Hu, P.C.

(57) ABSTRACT

Examples described herein relate to prioritizing read input/output (IO) queues in non-volatile memory express (NVME) storage devices. An NVME controller includes a host port, which may be associated with a host and communicate with NVME storage devices. A utilization time of the host port is determined. In response to determining that the utilization time of the host port is below a host port utilization threshold, the NVME controller may create a candidate list of NVME storage devices based on utilizations, throughputs, busy time periods, and IO request completions of the NVME storage devices. For each NVME storage device included in the candidate list, a number of read requests in a read IO queue at the NVME storage device may be determined. A priority rank may be assigned to the read IO queue at each NVME storage device based on the number of read requests in that read IO queue.

20 Claims, 7 Drawing Sheets

(56) References Cited

OTHER PUBLICATIONS

Lazowska et al., "Fundamental Laws," Quantitative System Performance: Computer System Analysis Using Queueing Network Models, Chapter 3, 1984, http:/web.archive.org/web/20210122164755/https://homes.cs.washington.edu/~lazowska/qsp/Images/Chap_03.pdf, 17 pages.

NVM Express Workgroup, "Command Arbitration," NVM Express specification, Revision 1.2.1, section 4.11, Jun. 5, 2016, pp. 1-2 and 70-72, <https://nvmexpress.org/wp-content/uploads/NVM_Express_1_2_1_Gold_20160603-1.pdf>.

Woo et al, "D2FQ: Device-Direct Fair Queueing for NVMe SSDs," Feb. 2021, Proceedings of the 19th USENIX Conference on File and Storage Technologies, <https://www.usenix.org/system/files/fast21-woo.pdf>.

* cited by examiner

PRIORITIZING READ IO QUEUES IN NON-VOLATILE MEMORY EXPRESS DEVICES

BACKGROUND

Non-volatile memory is a type of computer memory that retains data stored therein across power cycles and is therefore capable of being used as storage. With respect to non-volatile memory, Non-Volatile Memory Express (NVME) is a storage interface specification that specifies how host software and hardware communicates with non-volatile memory devices (e.g., Solid State Drives (SSDs)). Compared to prior interface protocols, NVME reduces Input/Output (IO) overhead, facilitates parallelization, and reduces latency.

BRIEF DESCRIPTION OF THE DRAWINGS

The following detailed description references the drawings, wherein.

DETAILED DESCRIPTION

Figure 1:
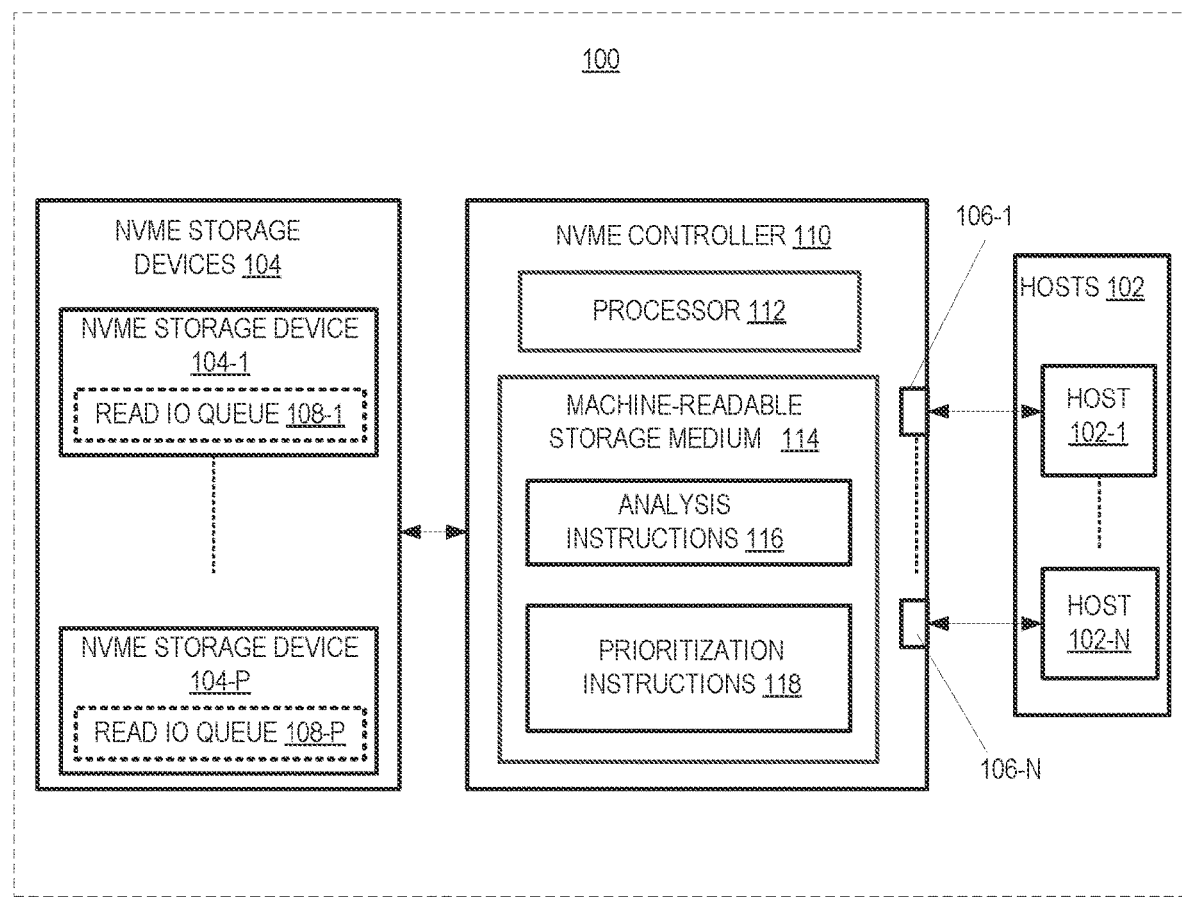
FIG. 1 is a block diagram of a system including a number of hosts and NVME storage devices, connected to an NVME controller, in accordance with an example.

Non-Volatile Memory Express (NVME) is a storage interface specification for communication between hosts and storage devices (e.g., SSDs on a Peripheral Component Interconnect Express (PCIe) bus). According to the NVME specification, a storage device may handle thousands of IO operations in parallel. To provide this benefit to enterprise-class data centers, NVME may be extended over fabrics for increased scalability and shareability. In this regard, NVME over fabrics (NVMEOF) is a flexible transport abstraction layer that provides for a consistent definition of NVME over a wide range of storage networking fabrics, such as Ethernet and Fibre Channel (FC). A storage device compatible with the NVME specification and able to process requests (e.g., read requests, write requests, administrative requests, etc.) consistent with and/or provided according to the NVME specification is referred to as an "NVME storage device" (also referred to herein as a "storage device"). Example of an "NVME storage device" may include solid-state drives (SSDs) compatible with the NVME specification. A host may be a computing system or device that may access data stored in and write data to one or more NVME storage devices. In some examples, the host may be a server providing services to client(s) based on the data stored at one or more of the NVME storage devices.

The NVME specification defines both an interface (e.g., a register-level interface) and a command protocol used to communicate with the NVME storage devices. In a system utilizing the NVME specification, one or more NVME storage devices (e.g., including port(s) of the NVME storage device(s)) may be configured to communicate with a host. Communication between the host and one or more NVME storage devices may be implemented by an NVME controller. The NVME controller may be a storage array controller at a front-end that can manage one or more NVME storage devices, such as SSDs, at a back-end. A host may be connected to a host port on the NVME controller, thereby associating the host port with the host. In some examples, the host port may be a physical port acting as an interface between the host and the NVME controller. The interface between the NVME controller and the NVME storage device may be based on several queue pairs (i.e., paired submission and completion queues) shared between the NVME controller (e.g., including ports) of the NVME controller) and the NVME storage device (e.g., including port(s) of the NVME storage device). The queue pairs may be located either in the host memory or in the memory provided by the NVME storage device. In some examples, the NVME specification may allow up to 64K individual queue pairs per NVME storage device, and each queue pair can have up to 64K entries. Once the queue pairs are configured, these queue pairs may be used for communication between the NVME controller and an NVME storage device using the command protocol. Every new entry may be submitted to an NVME storage device using a submission command via a submission queue. When the submission command is processed, an entry (that has been previously associated with the submission queue from which the command was retrieved) may be put on a completion queue using a completion command, and an interrupt may be generated. There may be separate queue pairs for administration operations (e.g., creating and deleting queues or updating firmware on the device) and for IO operations (e.g., read and write operations). Separate queue pairs may avoid excessive delay of IO operations due to long-running administration operations. Each queue for IO operations between the NVME controller and an NVME storage device may include both read requests and write requests.

Generally, NVME storage devices can process IO operations at a faster rate as compared to the NVME controller. However, since a single NVME controller at the front-end may manage multiple NVME storage devices at the back-end, the processing bad at the NVME controller may increase manifold with the increase in processing bad in one or more of the NVME storage devices. Thus, the NVME controller may not be able to process requests to the NVME storage devices at an optimal rate, and consequently, Input-Output Operations per Second (IOPS) between the NVME controller and the NVME storage devices may be reduced thereby adversely affecting performance. Further, in some NVME storage devices, such as SSDs, the read requests are processed significantly faster compared to write requests. As each queue may include a mix of both read and write requests, the processing of read requests may be unduly delayed until the write requests are processed at the NVME storage devices. Additionally, the NVME controller may not prioritize outstanding requests at the NVME storage devices. The increase in outstanding requests that are pending for processing may lead to choking of IO operations at the NVME storage devices. As a result, there may be increased latency at the NVME storage devices and timeouts in application(s) running in the hosts.

Examples described herein provide dynamic prioritization of read IO queue between the NVME controller and the NVME storage device based on the number of read requests, consequently improving IOPS for storage applications. The examples described herein may include selecting an active host port at the NVME controller that has not been fully utilized and creating a candidate list of NVME storage devices that are associated with that host port. The candidate list may include bottleneck NVME storage devices for which prioritization of read IO queue could be considered. Examples described herein may create the candidate list based on various measures including, but not limited to, utilization, throughput, IO request completions, busy time periods, etc., associated with the NVME storage devices. A priority rank may be assigned to the read IO queues at each NVME storage device included in the candidate list based on the number of read requests in that read IO queue. Some examples described herein also assign priority rank to read IO queues based on utilization level of the associated storage device, thereby providing more granularity in prioritizing the read IO queues. In this manner, the read IO queues between the NVME controller and the NVME storage devices may be prioritized for processing based on the number of read requests and other factors as described herein. Prioritizing the read IO queues at one or more NVME storage devices may reduce the latency in processing IO operations from the hosts via the NVME storage devices and thereby reduce timeouts in applications running in the hosts.

FIG. 1 depicts an example system 100 including an NVME controller 110 (hereinafter also referred to as "controller 110") that facilitates connecting hosts 102 to communicate with NVME storage devices 104 (hereinafter also referred to as "storage devices 104"). In some examples, the storage devices 104 and the controller 110 may be included in a storage array, and the controller 110 may serve as a storage array controller of the storage array. The system 100 illustrated in FIG. 1 may include a plurality of NVME storage devices 104 (labeled as NVME storage devices 104-1 through 104-P) and a plurality of hosts 102 (labeled as hosts 102-1 through 102-N). Each of the NVME storage devices 104 may be accessed by a corresponding subset of the hosts 102. For example, a first subset of the hosts 102 can communicate with an NVME storage device 104-1, a second subset of the hosts 102 can communicate with an NVME storage device 104-2, and so on. In some examples, a given host of the hosts 102 can communicate with two or more NVME storage devices 104 (i.e., the given host may belong to two or more subsets of the hosts).

In some examples, the controller 110 may be attached to, be part of, be associated with, and/or be otherwise related to a fabric (e.g., NVME fabrics) to which the hosts 102 and NVME storage devices 104 are communicatively connected. The controller 110 may include at least one processor 112 communicatively coupled to a machine-readable storage medium 114 including at least analysis instructions 116 and prioritization instructions 118 that, when executed by the at least one processor 112, cause the controller 110 to perform actions described herein in relation to the controller 110. In some examples, the instructions of the controller 110 may be executed in a switch (e.g., embedded in a container), in a virtual machine (VM), or in an NVME storage device (e.g., the NVME storage device 104-1).

The controller 110 may facilitate connecting the hosts 102 to NVME storage devices 104-1 to 104-P. The hosts 102 may communicate to the NVME storage device(s) based on a mapping. For example, in FIG. 1, the mapping may indicate that the hosts labeled 102-1, . . . , 102-N can communicate with the NVME storage devices 104. The controller 110 may include host ports 106-1, . . . , 106-N, also referred to as host ports 106. Each of the hosts 102 may connect with a host port, from among the host ports 106, thereby associating each of the host ports 106 with a particular host. Each of the hosts 102 associated with a host port, from the host ports 106, may be enabled to communicate with an NVME storage device from a plurality of NVME storage devices 104.

The controller 110 may include analysis instructions 116 and prioritization instructions 118 to perform one or more functionalities of the controller 110 as described herein. In other examples, functionalities described herein in relation to the controller 110 may be implemented via hardware or any combination of hardware and machine-executable instructions. The combination of hardware and machine-executable instructions may be implemented in a number of different ways. For example, the machine-executable instructions may include processor-executable instructions stored on a non-transitory machine-readable storage medium and the hardware may include at least one processor (e.g., at least one processing resource, CPU, circuitry, etc.) to execute those instructions. In examples described herein, a single computing device (e.g., a storage array) may include a machine-readable storage medium storing the instructions and the processor (or other hardware) to execute the instructions, or the machine-readable storage medium storing instructions may be separate from and accessible by the computing device and the processor.

In some examples, a sampling interval may be configured for the controller 110. The sampling interval is indicative of a time interval at which the controller 110 is to perform one or more functionalities for prioritizing one or more of the read IO queues 108-1 to 108-P between the controller 110 and the NVME storage devices 104-1 to 104-P. The sampling interval may be a predefined value set by a user. The sampling interval may be, for example, 1800 seconds, 3600 seconds, and the like. In some examples, the prioritization instructions 118 may create two pairs of IO queues between the controller 110 and each NVME storage device 104-1 to 104-P. One pair of queues may include two submission queues and the other pair of queues may include two completion queues, for example. One submission queue and one completion queue may be dedicated for read operations (read IO queues 108-1 to 108-P) and the other submission queue and completion queue may be dedicated for write operations (write IO queues, not shown in FIG. 1). The read IO queues 108-1 to 108-P may be stored in a memory unit of the NVME storage device 104-1 to 104-P, or alternatively stored in a memory unit of the controller 110 or the hosts 102-1 to 102-N.

The analysis instructions 116 may determine a utilization time of each of the plurality of host ports 106-1 to 106-N. Although, in the description hereinafter, the operations/functionalities are described with reference to the host port 106-1 and storage device 104-1, similar operations/functionalities may also be performed in respect of each of the other host ports 106-2 to 106-N and each of the storage devices 104. The analysis instructions 116 may determine a throughput of the host port 106-1 based on a number of IO request completions at the host port 106-1 over the sampling interval. The IO request completions at the host port 106-1 may refer to IO requests serviced or processed at the host port 106-1 during the sampling interval. In some examples, the throughput of the host port 106-1 may be a ratio of a number of IO request completions at the host port 106-1 to the sampling interval.

Further, the analysis instructions 116 may determine an average service time of the host port 106-1. The average service time is indicative of the average time taken for processing an IO operation (read or write) by the host port 106-1. Processing an IO operation at the host port 106-1 may include inserting an IO request (read requests or write requests from the host 102) in a submission queue and receiving a response for the IO request at the completion queue from the storage device 104-1, for example. The average service time of the host port 106-1 may be computed as a ratio of a busy time period of the host port 106-1 and the number of IO request completions at the host port 106-1 over the sampling interval. The busy time period of the host port 106-1 refers to a time duration for which the host port 106-1 remains unavailable for further processing/receiving IO requests from the hosts 102, such as the host 102-1. The analysis instructions 116 may compute the utilization time of the host port 106-1 as a product of the throughput of the host port 106-1 and the average service time of the host port 106-1. The utilization time of each of the host ports 106-2 to 106-N may also be determined in a similar manner.

The analysis instructions 116 may compare the utilization time of the host port 106-1 with a host port utilization threshold. In some examples, the host port utilization threshold may be expressed in terms of percentage of the sampling interval for which the host port 106-1 is utilized. For example, the host port utilization threshold may be 98% of the sampling interval. The analysis instructions 116 may determine that a host port is fully utilized if the utilization time of host port is greater than the utilization threshold (e.g., 98%) and analyze the next host port 106-2, for example. In some examples, the analysis instructions 116 may determine whether the host port 106-1 is idle based on incoming IO requests from the host. For instance, the analysis instructions 116 may determine that the host port 106-1 is not receiving IO requests if the host port throughput, the average service time, or the host port utilization time is equivalent to zero. In response to determining that the host port 106-1 is not receiving IO requests, the analysis instructions 116 may analyze the next host port 106-2, for example.

In response to determining that the utilization time of the host port 106-1 is not fully utilized and that the host port 106-1 is not idle, the analysis instructions 116 may create a candidate list of storage devices. The candidate list may include NVME storage devices for which prioritization of read IO queues could be considered. The candidate list may be created based on measures including the utilization, the throughput, the busy time period, and the number of IO request completions, of each storage device 104-1 to 104-P. For example, the analysis instructions 116 may determine a number of IO request completions for each storage device 104-1 to 104-P over a sampling interval. The IO request completions at the storage device may refer to IO requests serviced or processed at the storage device during the sampling interval. Servicing or processing of IO requests may include completion of reading data from or writing data to the storage device 104-1.

The analysis instructions 116 may also determine a visit ratio of the storage device 104-1. The visit ratio of the storage device 104-1 may refer to the number of IO request completions at the storage device 104-1 per unit time of the sampling interval. Further, analysis instructions 116 may determine a throughput of the storage device 104-1 based on the visit ratio. In some examples, the throughput of the storage device 104-1 may be computed as a product of the visit ratio of the storage device 104-1 and the throughput of the host port 106-1. The analysis instructions 116 may determine a service demand for the storage device 104-1 as a product of the visit ratio of the storage device 104-1 and the average service time of the storage device 104-1. The average service time of the storage device may refer to the time taken for a storage device 104-1 to receive an IO request (read request or write request) and process the IO request. Further, the analysis instructions 116 may determine a utilization of the storage device 104-1 as a product of the throughput of the host port 106-1 and the service demand of the storage device 104-1. Likewise, throughputs, average service times, utilizations of the other storage devices 104-2 to 104-P may also be determined.

In some examples, the analysis instructions 116 may determine an average throughput, an average utilization, an average IO request completion of the storage devices 104-1 to 104-P. The average throughput may be a ratio of the total throughput of the storage devices 104-1 to 104-P and the total number of storage devices 104-1 to 104-P. The average utilization may be a ratio of the total utilization of the storage devices 104-1 to 104-P and the total number of storage devices 104-1 to 104-P. The average IO request completions may be a ratio of the total IO request completions of the storage devices 104-1 to 104-P and the total number of storage devices. The average service time of the storage devices 104-1 to 104-P may be a ratio of the total average service time of the 104-1 to 104-P to the number of storage devices 104-1 to 104-P.

The analysis instructions 116 may create the candidate list by including one or more of the storage devices 104-2 to 104-P based on a comparison of the performance of a given storage device 104-1 with the average performance of the storage devices 104-1 to 104-P. The performance may be characterized by the utilizations, throughputs, the busy time periods, and number of IO request completions as determined above. For example, the analysis instructions 116 may determine whether the utilization of the storage device 104-1 is greater than an average utilization of the storage devices 104-1 to 104-P. The analysis instructions 116 may determine whether the throughput of the storage device 104-1 is less than an average throughput of the storage devices 104-1 to 104-P. The analysis instructions 116 may determine whether the IO request completion of the storage device 104-1 is less than the average IO request completion of the storage devices 104-1 to 104-P. Further, the analysis instructions 116 may determine whether the busy time period of the storage device 104-1 is greater than the average service time of the storage devices. Based on the above determinations, the analysis instructions 116 may create the candidate list. For example, if the utilization is greater than the average utilization, the throughput and IO request completions of the storage device 104-1 are less than the average throughput and average IO request completions of the storage devices 104-1 to 104-P, and if the busy time periods of the storage device 104-1 is greater than the average service time of the storage devices 104-1 to 104-P, then the analysis instructions 116 may include the storage device 104-1 in the candidate list. While the examples described herein discusses the use of utilization, throughput, IO request completions, busy time periods, other examples may use additional or alternative measures that are not discussed to create the candidate list.

The prioritization instructions 118 may determine a number of read requests in a read IO queue at each storage device in the candidate list. A read request refers to an IO request from a host 102-1 to read data from one of the storage devices 104-1. Based on the number of read requests, the prioritization instructions 118 may assign a priority rank to the read IO queue 108-1 at the storage device 104-1. The priority rank may indicate the priority of a read IO queue 108-1 for processing at a storage device 104-1. Examples of the priority ranks may include 'URGENT', 'HIGH', 'MEDIUM', 'LOW', and the like. In such examples, the highest priority may be 'URGENT', and the lowest priority may be 'LOW'. In some examples, the prioritization instructions 118 may identify a read IO queue having the highest number of read requests in a storage device from the candidate list. In some examples, the prioritization instructions 118 may assign a highest priority rank (i.e., 'URGENT') to the identified read IO queue.

For each storage device in the candidate list, the prioritization instructions 118 may determine an average time for processing the read requests. In particular, prioritization instructions 118 may determine whether there is a change in the average time for processing read requests by the storage device 104-1 over two successive sampling intervals. In some examples, the average time for processing a first set of read requests by the storage device 104-1 during a first sampling interval may be compared with the average time for processing a second set of read requests by the storage device 104-1 in a second sampling interval, where the first and second sampling intervals are successive sampling intervals. Based on the comparison, the prioritization instructions 118 may determine the change in the average time for processing the read requests. In some examples, the change may indicate an increase or decrease in the average time for processing the read requests by the storage device 104-1. In some examples, for each storage device in the candidate list, the prioritization instructions 118 may determine whether the number of read requests in a read IO queue is greater than a number of write requests in a write IO queue. A write request refers to an IO request from a host to write data in one of the storage devices. The number of read requests and the number of write requests may be determined using the read-write ratio between the host port 106-1 and the storage device 104-1.

In response to determining that there is an increase in the average time for processing the read requests by the storage device 104-1 and to the number of read requests being greater than a number of write requests at the storage device 104-1, the prioritization instructions 118 may determine a quantity of read IO queues that have already been assigned the highest priority rank, i.e., 'URGENT', in the storage devices included in the candidate list. Based on the quantity of 'URGENT' read IO queues, prioritization instructions 118 may adjust priority rank assignments to ensure that an excessive number of read IO queues are not assigned the highest priority rank. In some examples, the prioritization instructions 118 may determine whether the quantity of read IO queues having the highest priority rank is less than a threshold quantity. The threshold quantity may be half of the total quantity of storage devices in the candidate list, for example.

In response to determining that the quantity of the read IO queues having the highest priority rank is less than the threshold quantity, the prioritization instructions 118 may determine whether the utilization of the storage device is in a threshold utilization range. In some examples, the threshold utilization range may refer to one or more ranges of predefined utilization values that are set based on user input. For example, a first threshold utilization range may include 95%-100% utilization values, a second threshold utilization range may include 75%-95%, and so on. The prioritization instructions 118 may determine a match between the utilization of the storage device 104-1 and one of the ranges of utilization values. The prioritization instructions 118 may assign a priority rank to the read IO queue based on the match. For example, a user may set the highest priority rank ('URGENT') for a range of utilization values of 95%-100% In response to determining that the storage device 104-1 is associated with a utilization of 98%, the priority instructions 120 may assign the highest priority rank to the read IO queue 108-1 of that storage device.

In some examples, the prioritization instructions 118 may determine that the quantity of read IO queues having the highest priority rank is less than a threshold quantity. Further, the prioritization instructions 118 may determine that the utilization of the storage device is not in a threshold utilization range. For example, the utilization of the storage device may be 40%, which is neither in the first threshold utilization range nor in the second threshold utilization range in the above example. In such examples, the prioritization instructions may determine whether the read IO pattern is a sequential pattern or not. In response to determining that the read IO pattern is a sequential pattern, the prioritization instructions 118 may assign a lowest priority rank or may not assign any priority rank to the read IO queue at the storage device.

In some examples, in response to determining that the average time for processing the read requests is decreasing or not increasing the prioritization instructions 118 may assign a lowest priority rank or may not assign a priority rank to the read IO queue 108-1 at the storage device 104-1. For example, if the average time for processing a read request is 0.2 ms (milliseconds) less than the average time for processing the previous read request, the prioritization instructions 118 may determine that the read IO queue may not be immediately processed at the storage device. In another example, in response to determining that the number of read requests is not greater than a number of write requests at the storage device 104-1, the prioritization instructions 118 may assign the lowest priority rank or not assign a priority rank to the read IO queue 108-1 at the storage device 104-1.

The prioritization instructions 118 may accordingly determine whether the read IO queues have to be prioritized or not and assign a priority rank accordingly. Based on the priority rank of the read IO queue, the controller 110 may prioritize the processing of the read requests in the read IO queue at the storage device 104-1. For example, the read IO queue with a highest priority rank ('URGENT') may be processed first. In the manner, as described above, the prioritization instructions 118 may prioritize read IO queues 108-1 to 108-P at the storage devices 104 based on the number of read requests and utilization. Likewise, in a similar manner, the prioritization instructions 118 may dynamically adjust the priority rank of read IO queues at the storage devices included in the candidate list. Thus, for each storage device included in the candidate list, a priority rank for the read IO queues may be determined based on which the processing of the read requests is performed.

Figure 2:
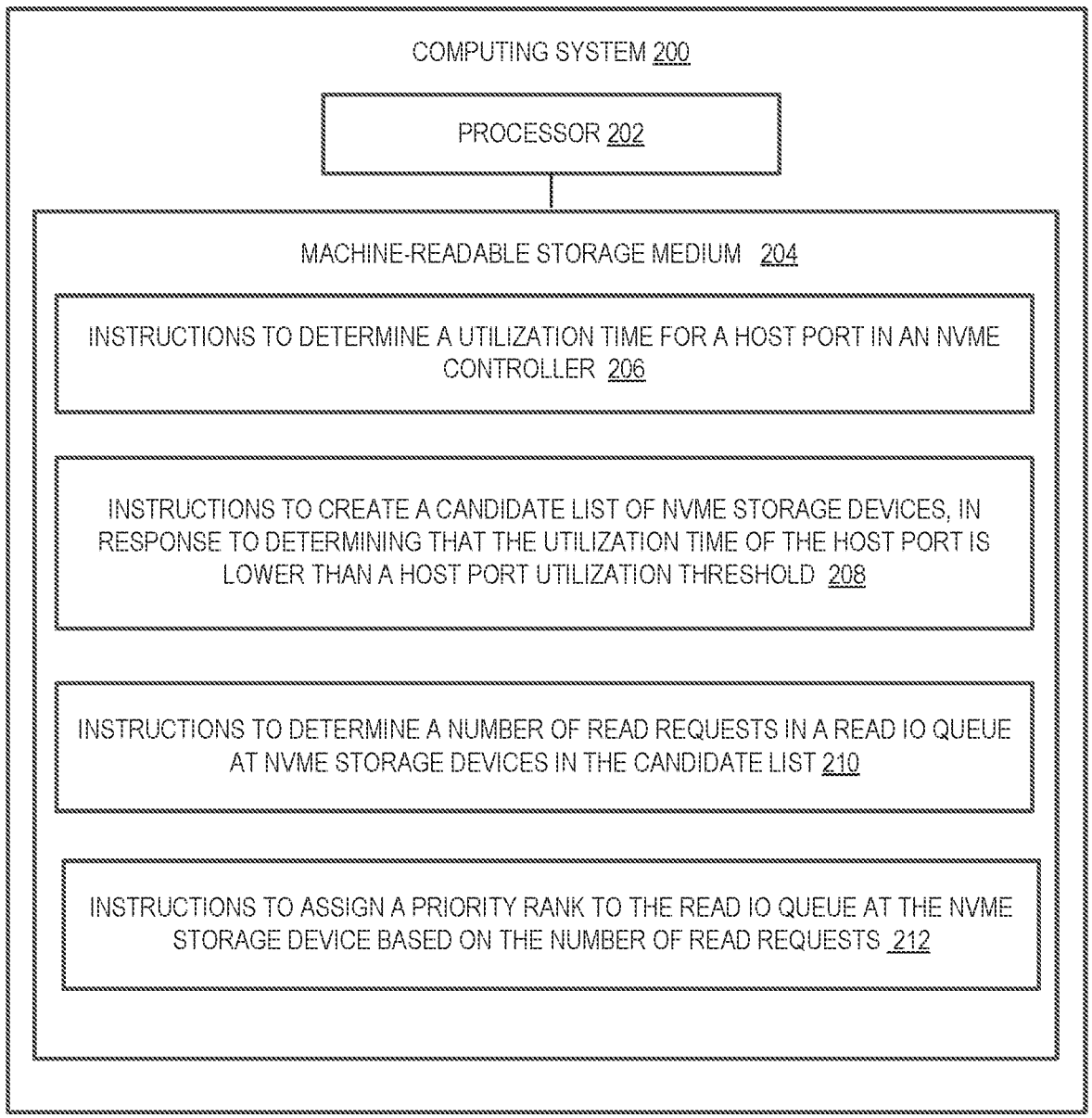
FIG. 2 is a block diagram of a computing system comprising a processor and a machine-readable storage medium encoded with example instructions to prioritize read IO queues between an NVME controller and a number of NVME storage devices, in accordance with an example.

FIG. 2 is a block diagram of a computing system 200 including a processor 202 and a machine-readable storage medium 204 encoded with example instructions 206, 208, 210, and 212 to prioritize read IO queues between an NVME controller (such as the controller 110 of FIG. 1) and an NVME storage device (such as the storage device 104-1 of FIG. 1), in accordance with an example.

In some examples, the machine-readable storage medium 204 may be accessed by the processor 202. The processor 202 may execute instructions (i.e., programming or code) stored on the machine-readable storage medium 204. The instructions 206, 208, 210, and 212 of FIG. 2, when executed by the processor 202, may implement various aspects of prioritizing read IO queues between the controller and the storage device. In some examples, the instructions 206 and 208 may be included within the analysis instructions 116, and the instructions 210 and 212 may be included within the prioritization instructions 118 of FIG. 1. In some examples, the computing system 200 may serve as or may be included in (e.g., as part of) an NVME controller (e.g., the NVME controller 110 of FIG. 1). For ease of illustration, FIG. 2 will be described with reference to FIG. 1. In certain examples, the instructions 206-212 may be executed for performing the functionalities of the NVME controller 110 and one or more methods, such as the methods 300, 400, 500A, and 500B described below with reference to FIGS. 3, 4, 5A, and 5B. In certain examples, as an alternative or in addition to executing the instructions 206-212, the processor 202 may include at least one integrated circuit, control logic, electronic circuitry, or combinations thereof that include a number of electronic components for performing the functionalities described herein as being performed by the controller 110.

Instructions 206, when executed by the processor 202, may determine a utilization time of the host port 106-1 in the NVME controller 110. The host port 106-1 is associated with a host 102-1 and is to communicate with an NVME storage device 104-1.

In response to determining that the utilization time of the host port 106-1 is lower than a host port utilization threshold, instructions 208 may create a candidate list of NVME storage devices. The candidate list may be created based on measures including utilizations, throughputs, busy time periods, and IO request completions of the NVME storage devices 104. In some examples, the instructions may include determining the utilization, throughput, busy time periods, and IO request completions of each NVME storage device 104-1 to 104-P and determining an average utilization, average throughput, and average IO request completions of all the NVME storage devices 104. The instructions may further include comparing the individual utilization, throughput, and IO request completions with the average utilization, average throughput, and IO request completions of the NVME storage devices. The busy time period of the NVME storage device may be compared with the average service time of the NVME storage devices. If the utilization of the NVME storage device is greater than the average utilization of the NVME storage devices and if the throughput and IO request completions at the NVME storage device are less than the average throughput and average IO request completions of all the NVME storage devices, and the busy time period is greater than the average service time of the NVME storage devices, then the NVME storage device may be included in the candidate list.

For the NVME storage device 104-1 included in the candidate list, instructions 210, when executed by the processor 202, may determine the number of read requests in a read IO queue at NVME storage devices. The number of read requests may include the number of outstanding read requests (i.e., queue depth) in the read IO queue. An outstanding read request may refer to a read request in the read IO queue that is pending for processing at the NVME storage device. Instructions 212, when executed by the processor 202, may assign a priority rank to the read IO queue at the NVME storage device based on the number of read requests. In some examples, the instructions may include identifying the read IO queue with the highest number of read requests and assigning the highest priority rank to that read IO queue. In other examples, the instructions may include identifying the read IO queue with the highest number of read requests and determining the utilization of the NVME storage device before assigning the priority rank.

The instructions 206-212 may include various instructions to execute at least a part of the methods described below with reference to FIGS. 3, 4, 5A and 5B. Also, although not shown in FIG. 2, the machine-readable storage medium 204 may also include additional program instructions to perform various other method blocks described below with reference to FIGS. 3-5B.

FIGS. 3-5B depict flowcharts of example methods 300, 400, 500A, and 500B, for prioritizing read IO queues between NVME storage devices (e.g., the NVME storage devices 104 of FIG. 1) and an NVME controller (NVME controller 110 of FIG. 1). For ease of illustration, the execution of example methods 300, 400, 500A, and 500B is described in detail below with reference to FIG. 1. Although the below description is described with reference to the NVME controller 110 of FIG. 1, other applications or devices suitable for the execution of methods 300, 400, 500A, and 500B may be utilized. Furthermore, although the below description is described with reference to the NVME storage device 104-1 of FIG. 1 the methods 300, 400, 500A, and 500B are applicable to other NVME storage devices. In some examples, each of the methods 300, 400, 500A, and 500B may be executed by each NVME storage device present in the system 100. The method steps at various blocks depicted in FIGS. 3-5B may be performed by the NVME controller 110. In some examples, each of the methods 300, 400, 500A, and 500B at each such method blocks may be executed by the computing system 200 via the processor 202 that executes the instructions 206-212 stored in the non-transitory machine-readable storage medium 204. Additionally, implementation of methods 300, 400, 500A, and 500B is not limited to such examples. Although each of the flowcharts of FIGS. 3-5B show a specific order of performance of certain functionalities, the methods 300, 400, 500A, and 500B are not limited to such order. For example, the functionalities shown in succession in the flowcharts may be performed in a different order, may be executed concurrently or with partial concurrence, or a combination thereof.

Figure 3:
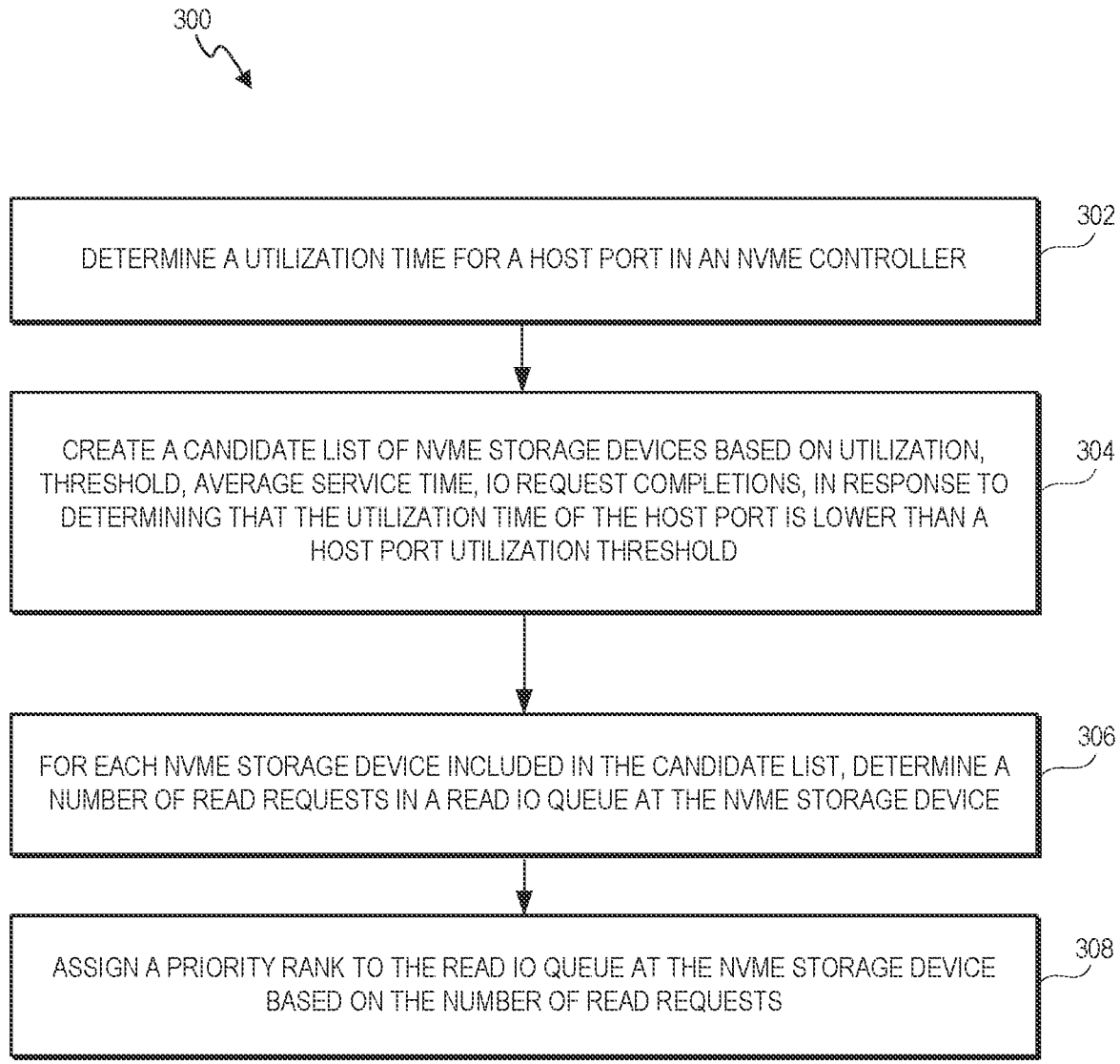
FIG. 3 is a flowchart of a method for prioritizing read IO queues between an NVME controller and a number of NVME storage devices, in accordance with an example.

In FIG. 3, at block 302, the method 300 may include determining a utilization time of the host port 106-1 in the NVME controller 110. The host port 106-1 is associated with a host 102-1 and is to communicate with an NVME storage device 104-1. The utilization time may be determined in the following example manner. In some examples, a throughput of the host port 106-1 may be determined based on a number of IO request completions at the host port 106-1 over the sampling interval. In some examples, the throughput of the host port 106-1 is a ratio of a number of IO request completions at the host port 106-1 to the sampling interval. Further, an average service time of the host port 106-1 may be determined. The average service time is indicative of the average time taken for servicing an IO request at the host port 106-1. The average service time of the host port 106-1 may be computed as a ratio of a busy time period of the host port 106-1 and the number of IO request completions at the host port 106-1 over the sampling interval. The busy time period of the host port 106-1 refers to a time duration for which the host port 106-1 remains unavailable for further processing receiving IO requests from the host 102-1. The utilization time of the host port 106-1 may be computed as a product of the throughput of the host port 106-1 and the average service time of the host port 106-1.

In response to determining that the utilization time of the host port 106-1 is lower than a host port utilization threshold, at block 304, the method 300 may include creating a candidate list of NVME storage devices. The candidate list may be created based measures including on the utilizations, throughputs, busy time periods and the IO request completions of the storage devices 104. In some examples, the storage devices 104 may be grouped or included in the candidate list if the utilization of the NVME storage device is greater than the average utilization of the NVME storage devices, the throughput of the NVME storage device is less than the average throughput of the NVME storage devices, the busy time of the NVME storage device is greater than the average service time of the NVME storage devices, and the IO request completion of the NVME storage device is less than the average IO request completion of the NVME storage devices.

At block 306, the method 300 may include, for the storage device, such as the storage device 104-1, included in the candidate list, determining a number of read requests in a read IO queue at the storage device 104-1. At block 308, the method 300 may include assigning a priority rank to the read IO queue at each storage device included in the candidate list based on the number of read requests as will be described further with reference to FIG. 5B.

Figure 4A:
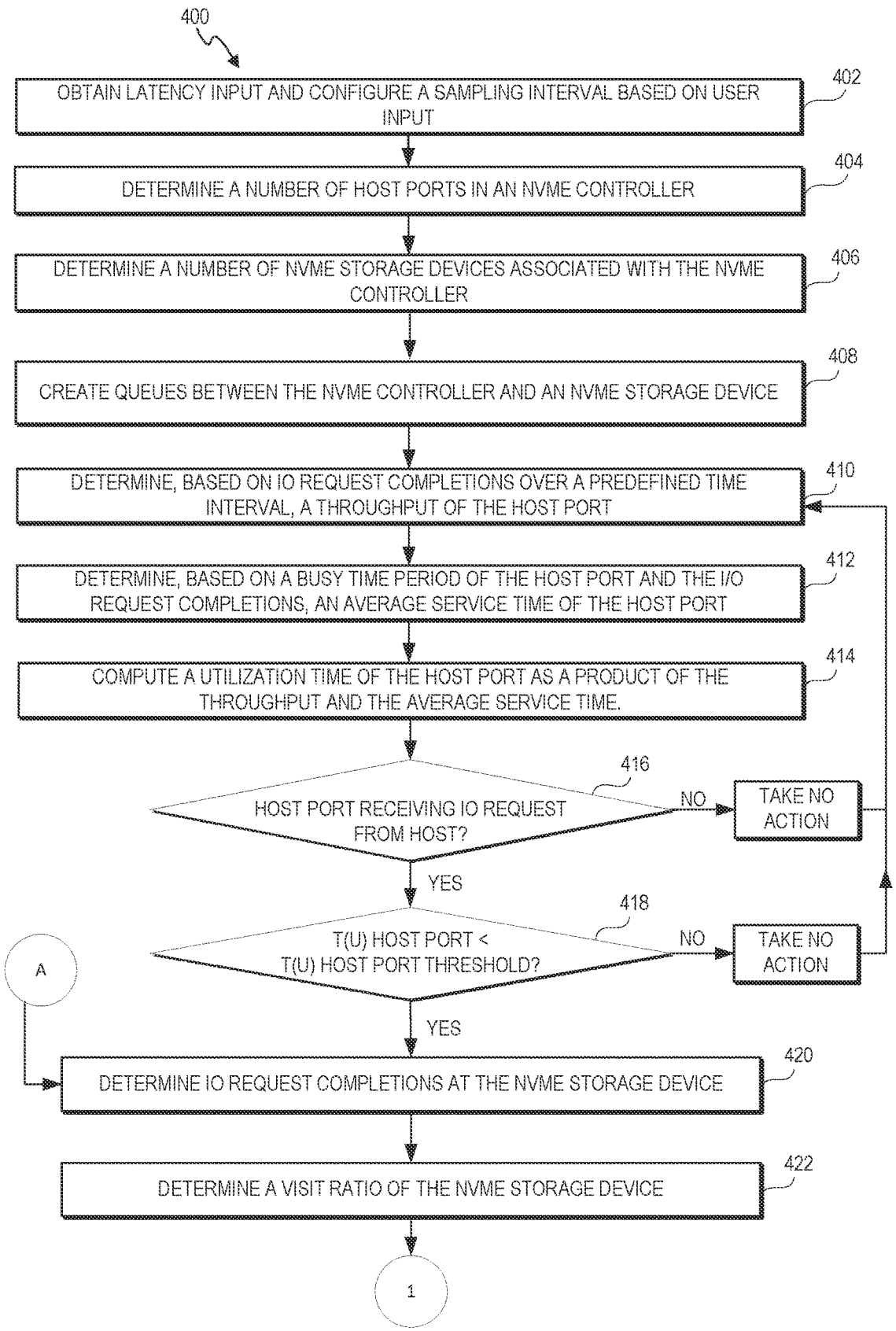
FIGS. 4A and 4B are flowcharts of a method for creating a candidate list of NVME storage devices for prioritizing read IO queues, in accordance with an example.
Figure 4B:
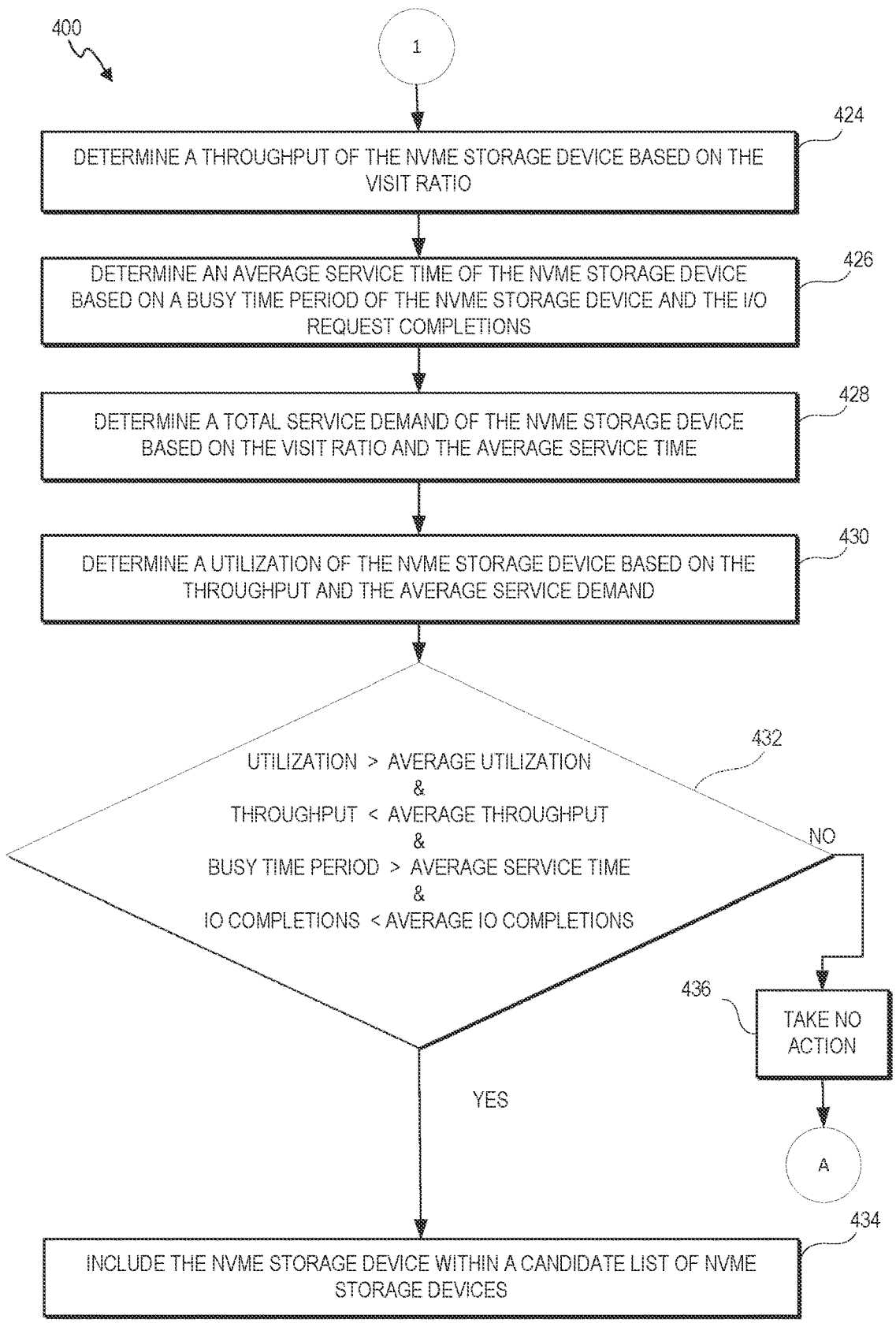

FIGS. 4A and 4B depict method 400 as a flowchart, which may be useful for creating a candidate list of storage devices, in accordance with an example. In some implementations, method 400 may be useful for performing at least part of block 304 of method 300.

As depicted in FIG. 4A, at block 402, the method 400 may include obtaining a latency input and configuring a sampling interval. The latency input may refer to a maximum time delay for IO operations that is requested by a workload executing on the host 102. The latency input may be received from the workload executing on the host 102, for example. Each workload may provide a different latency input, which may be 1 ms or 2 ms, for example. The sampling interval may be received as an input from the host 102.

At block 404, the method 400 may include determining a number of host ports 106-1 to 106-N in an NVME controller 110. The number of host ports 106-1 to 106-N may be determined based on the number of hardware connections between the host 102 and the controller 110. The hosts 102 and the controller 110 may be connected using Small Computer System Interface (SCSI)-based connections, Fibre Channel (FC)-based connections, Network File System (NFS)-based connections, for example. At block 406, the method 400 may include determining a number of NVME storage devices 104-1 to 104-P associated with the NVME controller 110. The NVME storage devices 104-1 to 104-P may be connected based on SCSI or PCIe connections, for example. In some examples, the storage devices 104 may register with the NVME controller 110 using a registration request and thereby associate with the NVME controller 110.

At block 408, the method 400 may include creating two pairs of queues between the NVME controller 110 and an NVME storage device, such as the NVME storage device 104-1. One pair of the queues may include a submission queue for read and write requests and other pair of the queues may include a completion queue for read and write requests.

At block 410, the method 400 may include determining a throughput of a host port 106-1 based on the IO request completions over the sampling interval. In some examples, the throughput of the host port 106-1 is a ratio of a number of IO request completions at the host port 106-1 to the sampling interval.

At block 412, the method 400 may include determining an average service time of the host port 106-1 based on a busy time period of the host port 106-1 and the IO request completions. In some examples, the average service time of the host port 106-1 may be computed as a ratio of a busy time period of the host port 106-1 and the number of IO request completions at the host port 106-1 over the sampling interval. The busy time period of the host port 106-1 refers to a time duration for which the host port 106-1 remains unavailable for further processing/receiving IO requests from the host 102-1.

At block 414, the method 400 may include computing a utilization time of the host port 106-1, abbreviated as T(U) host port, as a product of the throughput of the host port 106-1 and the average service time of the host port 106-1.

At block 416, the method 400 may include determining whether the host port 106-1 is idle based on the IO requests from the host. For example, the determination may be made based on throughput, utilization, or average service time of the host port. For example, the host port 106-1 may not be receiving IO requests if the host port throughput, the average service time, or the host port utilization time is equivalent to zero. In response to determining that the host port 106-1 is not receiving IO requests from a host ("NO" at block 416), the method may determine that no action has to be taken with respect to the host 106-1. In some examples, the method may include selecting another host port (e.g., host port 106-2) and performing the blocks 410-416 for that host port.

If the host port 106-1 is receiving IO requests from a host ("YES" at block 416), the method 400 proceeds to block 418 which may include comparing T(U) host port with a host port utilization threshold, abbreviated as T(U) host port threshold. In response to determining that T(U) host port for the host port 106-1 is equal to or greater than the T(U) host port threshold ("NO" at block 418), the method 400 may determine that no action has to be taken with respect to the host port 106-1. In some examples, the method may include selecting another host port (e.g., host port 106-2) and perform the blocks 410-416 of that host port. In response to determining that the T(U) host port for the host port 106-1 is less than the T(U) host port threshold ("YES" at block 418), the method 400 may include creating a candidate list of NVME storage devices corresponding to the host port 106-1. The candidate list may include NVME storage devices for which prioritization of the read IO queues could be considered.

At block 420 the method 400 may include, determining a number of IO request completions at the NVME storage device 104-1. At block 422, the method 400 may include determining a visit ratio of the NVME storage device 104-1. The visit ratio of the storage device 104-1 is defined as the number of IO request completions by the storage device 104-1 per unit time of the sampling interval.

FIG. 4B depicts a flowchart of the method 400 continued from FIG. 4A, in accordance with the example. At block 424, the method 400 may include determining throughput of the NVME storage device 104-1 based on the visit ratio. In some examples, the throughput of the storage device 104-1 may be computed as a product of the visit ratio of the storage device 104-1 and the throughput of the host port 106-1.

At block 426, the method 400 may include determining an average service time of the NVME storage device 104-1. The average service time may be based on a busy time period of the NVME storage device 104-1 and the number of IO request completions. For example, the average service time may be a ratio of the busy time period of the NVME storage device and the IO request completions at the NVME storage device. The busy time period of the storage device 104-1 may indicate a time period for which the storage device 104-1 may remain busy to process new IO requests during the sampling interval.

At block 428, the method 400 may include determining a total service demand of the NVME storage device based on the visit ratio and the average service time of the NVME storage device. For example, the total service demand may be computed as a product of the visit ratio and the average service time of the NVME storage device. At block 430, the method 400 may include determining utilization of the NVME storage device based on the throughput and the average service demand. For example, the utilization may be computed as a product of the average service demand and the throughput of the NVME storage device.

At block 432, the method 400 may include determining whether the NVME storage device may be included in the candidate list. For example, the method may compare the utilization of the NVME storage device 104-1 with the average utilization of the NVME storage devices 104-1 to 104-P. The method may also compare the throughput of the NVME storage device 104-2 with the average throughput NVME storage devices 104-1 to 104-P. Further, the method 400 may compare the busy time of the NVME storage device 104-1 with the average service time of the NVME storage devices. Additionally, the IO request completions of the NVME storage device may be compared with the average IO request completions of the NVME storage devices 104-1 to 104-P.

At block 434, the method may include grouping or including the NVME storage device in the candidate list in response to determining that the utilization of the NVME storage device 104-1 is greater than the average utilization of the NVME storage devices 104-1 to 104-P, and the throughput of the NVME storage device 104-1 is less than the average throughput NVME storage devices 104-1 to 104-P, and the busy time period of the NVME storage device 104-1 is greater than the average service time of the NVME storage devices 104-1 to 104-P, and the IO request completions of the NVME storage device 104-1 is less than the average IO request completions of the NVME storage devices 104-1 to 104-P ("YES" at block 432). If one or more of the conditions at block 432 are not satisfied ("NO" at block 432), the method 400 may include not taking an action, i.e., the storage device 104-1 is not included in the candidate list at block 436. In some examples, the method may include selecting another NVME storage device (e.g. storage device 104-2) and perform the blocks 420 to 432.

Figure 5A:
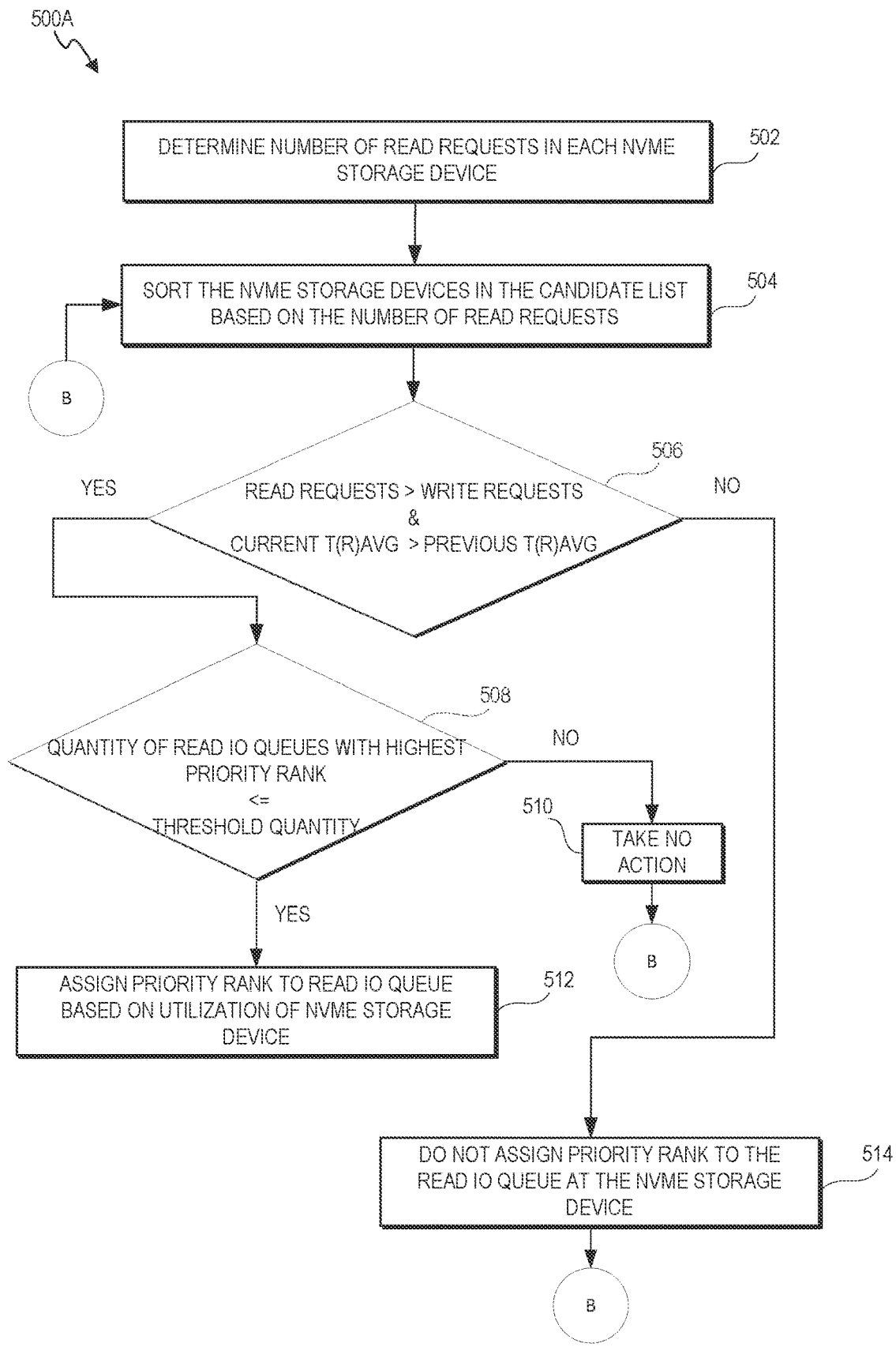
FIG. 5A is a flowchart of a method for prioritizing read IO queues between an NVME controller and a number of NVME storage devices, in accordance with an example.

FIG. 5A depicts a method 500A for prioritizing the read IO queues at the NVME storage devices in the candidate list. At block 502, the method 500A may include determining the number of read requests in a read IO queue of each NVME storage device 104-1 to 104-P. In some examples, the number of read requests may refer to the number of outstanding read requests in the read IO queue of each NVME storage device 104-1 to 104-P. In some examples, the read IO queue with the highest number of read requests may be assigned a highest priority rank.

Each NVME storage device 104-1 to 104-P may include a read IO queue with similar or varying number of read requests. At block 504, the method 500A may include sorting the candidate list based on the number of read requests in the respective read IO queues. The NVME storage device with a read IO queue with the highest number of read requests may be the first and the NVME storage device with a read IO queue with least number of read requests may be the last, for example.

At block 506, for each of the NVME storage devices in the sorted candidate list, the method 500A may include comparing the number read requests in read IO queue and the write requests in write IO queue. The number of read requests may be determined based on the read-write ratio, which may be the ratio of read requests and write requests between the controller and the storage device, for example. At block 506, the method 500A may also include determining whether the average time for processing read requests in the read IO queue is increasing or not. For example, the method 500A may include comparing the average time ("CURRENT T(R)AVG") for processing a first set of read requests by the storage device 104-1 during the current sampling interval with the average time ("PREVIOUS T(R) AVG") for processing a second set of read requests by the storage device 104-1 in a previous sampling interval. In some examples, at block 506, the method may further include determining a block size of the read requests. i.e., whether the block size is a small block size (less than 16K) or large block size (greater than 16K). In some examples, at block 506, the method may also include determining the IO pattern of the read IO queue, i.e., whether the IO pattern is random pattern or sequential pattern, which may be used for priority rank assignment (described in relation to FIG. 5B).

In response to determining that the number of read requests is more than the number of write requests and that there is an increase in the average time for processing read requests by the storage device 104-1 ("YES" at block 506), the method 500A may determine whether a priority rank has to be assigned to the queue or not. The assignment of priority rank may be performed depending on the quantity of read IO queues at the storage devices in the candidate list that have already been assigned the highest priority rank, for example. At block 508, the method 500A may include determining whether the quantity of read IO queues is less than or equal to a threshold quantity. The threshold quantity may be a predefined number configured based on a user input. For example, the threshold quantity may be half the number of storage devices in the candidate list. In response to determining that the quantity of read IO queues with highest priority rank is more than the threshold quantity ("NO" at block 508), at block 510, the method 500A may not take an action, i.e., not perform the assignment of priority rank to the read IO queue of that storage device. The method 500A may select the next storage device in the sorted candidate list and perform the method blocks 504 and 506, for example.

Figure 5B:
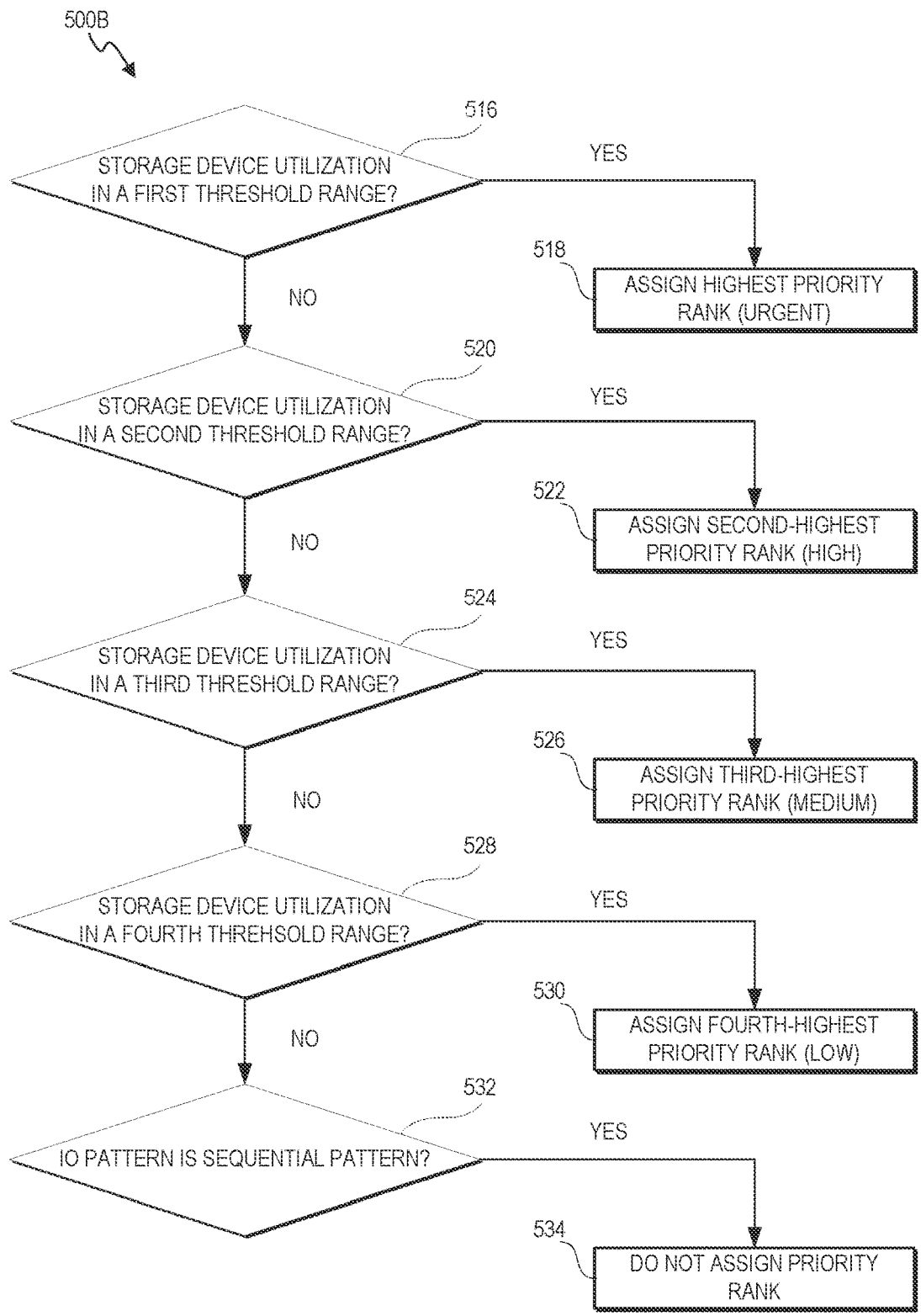
FIG. 5B is a flowchart of a method for assigning a priority rank to the read IO queues between an NVME controller and a number of NVME storage devices, in accordance with an example.

In response to determining that the quantity of read IO queues with highest priority rank is less than or equal to the threshold quantity ("YES" at block 508), the method 500A, at block 512, may include assigning a priority rank to the read IO queue based on the utilization of the associated storage device (described further in relation to FIG. 5B). Further, at block 506, in response to determining that the number of read requests is not more than the write requests or that the average time for processing the read requests is not increasing ("NO" at block 506), the method 500A, at block 514, may include not assigning a priority rank to the read IO queue at the storage device. In some examples, the method 500A may include assigning a lowest priority rank to the read IO queue. Further, the method 500A may include selecting the next storage device from the sorted candidate list and perform the method block 506.

FIG. 5B depicts a flow diagram of a method 500B for assigning a priority rank to the read IO queue at each NVME storage device, in accordance with an example. The method 500B of FIG. 5B may be an example implementation of the block 512 of FIG. 5A. The method 500B may include determining whether the utilization of the storage device is in a predefined threshold utilization range. In some examples, the predefined threshold utilization range may be configured based on user input. From block 516 to block 530, the method 500B may include determining whether the utilization of the storage device is in one of the ranges of the predefined threshold utilization. For example, the first range of predefined threshold utilization may include a range of more than 95% utilization. A second threshold range may include 75-95% utilization range. A third threshold range may include 50-75% of utilization. A fourth threshold range may include less than 50% of utilization.

Based on a match between the utilization of the storage device and the threshold utilization range, a priority rank may be assigned to the read IO queue of that storage device. The priority rank may indicate the level of urgency for processing the read requests. Examples of a priority rank may include 'URGENT', 'HIGH', 'MEDIUM', 'LOW', and the like. Table 1 depicts an example set of predefined threshold utilization range and priority ranks for the respective threshold utilization range.

TABLE 1

Example priority rank assignment based on utilization levels

| Utilization range | Priority rank |
|---|---|
| Utilization >= 95% | URGENT |
| Utilization > 95% and <= 75% | HIGH |
| Utilization > 75% and <= 50% | MEDIUM |
| Utilization < 50% | LOW |

At block 516, the method may include determining whether the utilization of the storage device 104-1 is in a first utilization threshold range (e.g., greater than or equal to 95%) or not. In response to determining that the storage device utilization is greater than or equal to 95% ("YES" at block 516), at block 518, the method 500B may include assigning the highest priority rank, i.e., 'URGENT' priority rank. If the utilization is not in the first threshold utilization range ("NO" at block 516), at block 520, the method 500E may include determining whether the utilization of the storage device 104-1 is in a second threshold utilization range (e.g., greater than or equal to 75% and less than 95%) or not. In response to determining that the storage device utilization is greater than or equal to 75% and less than 95% ("YES" at block 520), at block 522, the method 500E may include assigning a second-highest priority rank, i.e., 'HIGH' priority. If the utilization is not in the second threshold utilization range ("NO" at block 520), at block 524, the method 500B may include determining whether the utilization of the storage device 104-1 is in a third threshold utilization range (e.g., greater than or equal to 50% and less than 75%) or not. In response to determining that the storage device utilization is greater than or equal to 50% and less than 75% ("YES" at block 524), at block 526, the method 500B may include assigning a third-highest priority rank, i.e., 'MEDIUM' priority. Further, if the utilization is not in the third threshold utilization range ("NO" at block 524), at block 528, the method 500B may include determining whether the utilization of the storage device 104-1 is in a fourth threshold utilization range (e.g., less than 50%) or not. In response to determining that the storage device utilization is less than 50% ("YES" at block 528), at block 530, the method 500B may include assigning a fourth-highest priority rank, i.e., 'LOW' priority. In some examples, the utilization of the storage device may not match with a predefined threshold utilization range ("NO" at block 528). In such examples, at block 532, the method 500B may include determining whether the IO pattern of the read IO queue at the storage device is a sequential pattern or random pattern. In response to determining that the IO pattern is a sequential pattern ("YES" at block 532), at block 534, the method 500B may not assign a priority rank to the read IO queue. In some examples, the method 500B, at block 534, may include assigning the lowest priority rank to the read IO queue. In this manner, the read IO queues between the controller 110 and the storage devices in the candidate list may be dynamically prioritized.

Examples are described herein with reference to FIGS. 1-5B. It should be noted that the description and figures merely illustrate the principles of the present subject matter along with examples described herein and should not be construed as limiting the present subject matter. Although some examples may be described herein with reference to a single NVME storage device, examples may be utilized for several NVME storage devices. Furthermore, any functionality described herein as performed by a component (e.g., an NVME controller, an NVME storage device or a host) of a system may be performed by at least one processor of the component executing instructions (stored on a machine-readable storage medium) to perform the functionalities described herein. Various implementations of the present subject matter have been described below by referring to several examples.

The terminology used herein is for the purpose of describing particular examples only and is not intended to be limiting. As used herein, the singular forms "an," and "the" are intended to include the plural forms as well, unless the context clearly indicates otherwise. The term "plurality," as used herein, is defined as two or more than two. The term "another," as used herein, is defined as at least a second or more. The term "connected," as used herein, is defined as coupled or associated, whether directly without any intervening elements or indirectly with at least one intervening element, unless otherwise indicated. Two elements can be connected mechanically, electrically, or communicatively linked through a communication channel, pathway, network, or system. The term "and/or" as used herein refers to and encompasses any and all possible combinations of the associated listed items. The term "based on" means based at least in part on. It will also be understood that, although the terms first, second, third, etc. may be used herein to describe various elements, these elements should not be limited by these terms, as these terms are only used to distinguish one element from another unless stated otherwise or the context indicates otherwise.

In examples described herein, functionalities described as being performed by "instructions" may be understood as functionalities that may be performed by those instructions when executed by a processor. In other examples, functionalities described in relation to instructions may be implemented by any combination of hardware and programming.

As used herein, a "computing device" may be a server, storage device, storage array, desktop or laptop computer, switch, router, or any other processing device or equipment including a processor. In examples described herein, a processor may include, for example, one processor or multiple processors included in a single computing device or distributed across multiple computing devices. As used herein, a "processor" may be at least one of a central processing unit (CPU), a semiconductor-based microprocessor, a graphics processing unit (GPU), a field-programmable gate array (FPGA) configured to retrieve and execute instructions, other electronic circuitry suitable for the retrieval and execution instructions stored on a machine-readable storage medium, or a combination thereof. In examples described herein, a processing resource may fetch, decode, and execute instructions stored on a storage medium to perform the functionalities described in relation to the instructions stored on the storage medium. In other examples, the functionalities described in relation to any instructions described herein may be implemented in the form of electronic circuitry, in the form of executable instructions encoded on a machine-readable storage medium, or a combination thereof. The storage medium may be located either in the computing device executing the machine-readable instructions, or remote from but accessible to the computing device (e.g., via a computer network) for execution. In the examples illustrated in FIGS. 1-5B NVME controller 110 may be implemented by one machine-readable storage medium, or multiple machine-readable storage media.

As used herein, a "machine-readable storage medium" may be any electronic, magnetic, optical, or other physical storage apparatus to contain or store information such as executable instructions, data, and the like. For example, any machine-readable storage medium described herein may be any of RAM, EEPROM, volatile memory, non-volatile memory, flash memory, a storage drive (e.g., an HDD, an SSD), any type of storage disc (e.g., a compact disc, a DVD, etc.), or the like, or a combination thereof. Further, any machine-readable storage medium described herein may be non-transitory. In examples described herein, a machine-readable storage medium or media may be part of an article (or article of manufacture). All of the features disclosed in this specification (including any accompanying claims, abstract, and drawings), and/or all of the elements of any method or process so disclosed, may be combined in any combination, except combinations where at least some of such features and/or elements are mutually exclusive.

The foregoing description of various examples has been presented for purposes of illustration and description. The foregoing description is not intended to be exhaustive or limiting to the examples disclosed, and modifications and variations are possible in light of the above teachings or may be acquired from practice of various examples. The examples discussed herein were chosen and described in order to explain the principles and the nature of various examples of the present disclosure and its practical application to enable one skilled in the art to utilize the present disclosure in various examples and with various modifications as are suited to the particular use contemplated. The features of the examples described herein may be combined in all possible combinations of methods, apparatus, systems, and computer program products.

What is claimed is:

1. A method comprising:
    receiving, at a host port of a Non-Volatile Memory Express (NVME) controller, input/output (IO) requests from a host, wherein the NVME controller is to support communications between the host and NVME storage devices;
    determining, by the NVME controller, a utilization time of the host port;
    based on determining that the utilization time of the host port is lower than a host port utilization threshold, creating, by the NVME controller, a candidate list of NVME storage devices based on utilizations, throughputs, busy time periods, and IO request completions of the NVME storage devices in the candidate list;
    assigning, by the NVME controller, priority ranks to the NVME storage devices in the candidate list, wherein the assigning comprises, for each respective NVME storage device in the candidate list:
        determining a number of read requests in a read IO queue of the respective NVME storage device; and
        assigning a priority rank to the read IO queue of the respective NMVE storage device based on the number of read requests; and
    based on a first NVME storage device in the candidate list being assigned a highest priority rank of the priority ranks, prioritizing a processing of read requests in a read IO queue of the first NVME storage device over read requests in a read IO queue of another NVME storage device in the candidate list.

2. The method of claim 1, wherein the determining of the utilization time of the host port comprises:
    determining, based on IO request completions over a sampling interval, a throughput of the host port;
    determining, based on a busy time period of the host port and the IO request completions, an average service time of the host port; and
    computing the utilization time of the host port based on a product of the throughput of the host port and the average service time.

3. The method of claim 1, wherein the creating of the candidate list comprises:
    for each corresponding NVME storage device of the NVME storage devices:
        determining IO request completions at the corresponding NVME storage device over a sampling interval;
        determining, based on a busy time period of the corresponding NVME storage device and the IO request completions, an average service time of the corresponding NVME storage device;
        determining, based on a host port throughput and a visit ratio of the NVME storage devices, a throughput of the corresponding NVME storage device; and
        determining, based on a total service demand and the throughput of the NVME storage devices, a utilization of the corresponding NVME storage device.

4. The method of claim 3, wherein the creating of the candidate list comprises:
    including the corresponding NVME storage device in the candidate list, in response to determining that:
        the utilization of the corresponding NVME storage device is greater than an average utilization of the NVME storage devices;
        the throughput of the corresponding NVME storage device is less than an average throughput of the NVME storage devices;
        the busy time period of the corresponding NVME storage device is greater than an average service time of the NVME storage devices; and the IO request completions of the corresponding NVME storage device is less than average IO request completions of the NVME storage devices.

5. The method of claim 1, wherein the assigning of the highest priority rank to the first NVME storage device comprises:
identifying, from read IO queues of the NVME storage devices in the candidate list, the read IO queue of the first NVME storage device as having a highest number of read requests.

6. The method of claim 1, wherein the assigning of the priority ranks comprises:
in response to an increase in an average time for processing read requests and to a number of read requests being greater than a number of write requests at a given NVME storage device in the candidate list:
determining, for the NVME storage devices in the candidate list, whether a quantity of read IO queues having the highest priority rank is less than a threshold quantity.

7. The method of claim 6, wherein the assigning of the priority ranks comprises:
in response to determining that the quantity of read IO queues having the highest priority rank is less than the threshold quantity:
determining whether a utilization of the given NVME storage device is in a threshold utilization range; and
in response to determining that the utilization of the given NVME storage device is in the threshold utilization range, assigning, to the read IO queue of the given NVME storage device, a priority rank associated with the threshold utilization range.

8. The method of claim 7, comprising:
in response to determining that the utilization of the given NVME storage device is not in the threshold utilization range:
determining whether a read IO pattern at the given NVME storage device is a sequential pattern; and
in response to determining that the read IO pattern at the given NVME storage device is the sequential pattern, assigning a lowest priority rank to the read IO queue of the given NVME storage device.

9. The method of claim 6, comprising:
in response to determining that the number of read requests at the given NVME storage device is not greater than the number of write requests at the given NVME storage device or that the average time for processing the read requests at the given NVME storage device is not increasing:
assigning a lowest priority rank to the read IO queue of the given NVME storage device.

10. The method of claim 1, wherein a read request received at the host port is added to a read IO queue of an NVME storage device of the NVME storage devices.

11. A Non-Volatile Memory System (NVME) controller comprising:
a host port;
at least one processor; and
a non-transitory machine-readable storage medium comprising instructions that, when executed, cause the at least one processor to:
receive, at the host port of the NVME controller, input/output (IO) requests from a host, wherein the NVME controller is to support communications between the host and NVME storage devices;
determine a utilization time of the host port;
based on determining that the utilization time of the host port is lower than a host port utilization threshold, create a candidate list of NVME storage devices based on utilizations, throughputs, busy time periods, and IO request completions of the NVME storage devices;
assign priority ranks to the NVME storage devices in the candidate list, wherein the assigning comprises, for each respective NVME storage device in the candidate list:
determining a number of read requests in a read IO queue of the respective NVME storage device; and
assign a priority rank to the read IO queue of the respective NVME storage device based on the number of read requests; and
based on a first NVME storage device in the candidate list being assigned a highest priority rank of the priority ranks, prioritizing a processing of read requests in a read IO queue of the first NVME storage device over read requests in a read IO queue of another NVME storage device in the candidate list.

12. The NVME controller of claim 11, wherein to determine the utilization time of the host port, the at least one processor executes instructions to:
determine, based on IO request completions over a sampling interval, a throughput of the host port;
determine, based on a busy time period of the host port and the IO request completions, an average service time of the host port; and
compute the utilization time of the host port as a product of the throughput of the host port and the average service time.

13. The NVME controller of claim 11, wherein to create the candidate list, the at least one processor executes instructions to:
for each corresponding NVME storage device of the NVME storage devices:
determine IO request completions at the corresponding NVME storage device over a sampling interval;
determine, based on a busy time period of the corresponding NVME storage device and the IO request completions, an average service time of the corresponding NVME storage device;
determine, based on a host port throughput and a visit ratio of the NVME storage devices, a throughput of the corresponding NVME storage device; and
determine, based on a total service demand and the throughput of the NVME storage devices, a utilization of the corresponding NVME storage device.

14. The NVME controller of claim 13, wherein to create the candidate list, the at least one processor executes instructions to:
include the corresponding NVME storage device in the candidate list, in response to determining that:
the utilization of the corresponding NVME storage device is greater than an average utilization of the NVME storage devices;
the throughput of the corresponding NVME storage device is less than an average throughput of the NVME storage devices;
the busy time period of the corresponding NVME storage device is greater than an average service time of the NVME storage devices; and the IO request completions of the corresponding NVME storage device is less than average IO request completions of the NVME storage devices.

15. The NVME controller of claim 11, wherein to assign the highest priority rank to the first NVME storage device, the at least one processor executes instructions to:
identify, from read IO queues of the NVME storage devices in the candidate list, the read IO queue of the first NVME storage device as having a highest number of read requests.

16. The NVME controller of claim 11, wherein to assign the priority ranks, the at least one processor executes instructions to:
in response to an increase in an average time for processing read requests and to a number of read requests being greater than a number of write requests at a given NVME storage device in the candidate list:
determine, for the NVME storage devices in the candidate list, whether a quantity of read IO queues having the highest priority rank is less than a threshold quantity.

17. The NVME controller of claim 16, wherein to assign the priority ranks, the at least one processor executes instructions to:
in response to determining that the quantity of read IO queues having the highest priority rank is less than the threshold quantity:
determine whether a utilization of the given NVME storage device is in a threshold utilization range; and
in response to determining that the utilization of the given NVME storage device is in the threshold utilization range, assign, to the read IO queue of the given NVME storage device, a priority rank associated with the threshold utilization range.

18. The NVME controller of claim 11, wherein a read request received at the host port is added to a read IO queue of an NVME storage device of the NVME storage devices.

19. A non-transitory machine readable machine-readable medium comprising instructions that when executed cause a Non-Volatile Memory Express (NVME) controller to:
determine a utilization time of a host port in the NVME controller, wherein the host port is associated with a host and is to communicate with NVME storage devices, and the host port is to receive input/output (IO) requests from the host;
in response to determining that the utilization time of the host port is lower than a host port utilization threshold, create a candidate list of NVME storage devices based on utilizations, throughputs, busy time periods, and IO request completions of the NVME storage devices;
assign priority ranks to the NVME storage devices in the candidate list, wherein the assigning comprises, for each respective NVME storage device in the candidate list:
determine a number of read requests in a read IO queue associated with the respective NVME storage device and the NVME controller; and
assign a priority rank to the read IO queue based on the number of read requests; and
based on a first NVME storage device in the candidate list being assigned a highest priority rank of the priority ranks, prioritizing a processing of read requests in a read IO queue associated with the first NVME storage device over read requests in a read IO queue associated with another NVME storage device that is assigned a lower priority rank.

20. The non-transitory machine-readable medium of claim 19, wherein the instructions to determine the utilization time of the host port comprise instructions to:
determine, based on IO request completions over a sampling interval, a throughput of the host port;
determine, based on a busy time period of the host port and the IO request completions, an average service time of the host port; and
compute the utilization time of the host port as a product of the throughput of the host port and the average service time.

\* \* \* \* \*